(12) United States Patent
Sylvester et al.

(10) Patent No.: US 8,092,061 B2
(45) Date of Patent: Jan. 10, 2012

(54) PIPE HAVING LIGHT-REDIRECTING CHANNELS

(75) Inventors: Gail M. Sylvester, Frankenmuth, MI (US); Raymond Lippmann, Howell, MI (US); Martin L. Adams, Flushing, MI (US)

(73) Assignee: Delphi Technologies, Inc., Troy, MI (US)

( * ) Notice: Subject to any disclaimer, the term of this patent is extended or adjusted under 35 U.S.C. 154(b) by 407 days.

(21) Appl. No.: 12/423,937

(22) Filed: Apr. 15, 2009

(65) Prior Publication Data

US 2010/0265735 A1      Oct. 21, 2010

(51) Int. Cl.
*F21V 5/02* (2006.01)

(52) U.S. Cl. .. 362/559; 362/555; 362/97.3; 362/311.04; 362/311.06; 362/623

(58) Field of Classification Search ............... 362/608, 362/612, 555, 559, 561, 545, 97.3, 249.02, 362/311.02, 311.04, 311.06; 349/62
See application file for complete search history.

(56) References Cited

U.S. PATENT DOCUMENTS

| | | | |
|---|---|---|---|
| 5,397,867 A | 3/1995 | Demeo | |
| 6,561,663 B2* | 5/2003 | Adachi et al. | 362/616 |
| 7,118,236 B2* | 10/2006 | Hahm et al. | 362/27 |
| 7,160,003 B2* | 1/2007 | Saitoh et al. | 362/330 |
| 7,422,357 B1* | 9/2008 | Chang | 362/602 |
| 7,513,656 B2* | 4/2009 | Park et al. | 362/333 |
| 2002/0097578 A1* | 7/2002 | Greiner | 362/240 |
| 2006/0013002 A1* | 1/2006 | Coushaine et al. | 362/308 |
| 2006/0133062 A1 | 6/2006 | Feng et al. | |
| 2007/0076433 A1* | 4/2007 | Kinoshita et al. | 362/615 |
| 2007/0086179 A1* | 4/2007 | Chen et al. | 362/27 |
| 2007/0147073 A1* | 6/2007 | Sakai et al. | 362/607 |
| 2008/0055931 A1* | 3/2008 | Verstraete et al. | 362/612 |
| 2008/0137335 A1* | 6/2008 | Tsai et al. | 362/247 |
| 2008/0225522 A1 | 9/2008 | Ito | |
| 2008/0266878 A1 | 10/2008 | Chang | |

FOREIGN PATENT DOCUMENTS

| | | |
|---|---|---|
| EP | 1640756 | 3/2006 |
| EP | 1959277 | 8/2008 |
| JP | 2001305535 A | 10/2001 |

OTHER PUBLICATIONS

Light Measurement Handbook, by Alex Roger. "How Light Behaves".
Light Guide Techniques Using LED Lamps. Application Brief, I-003.
European Search Report dated Jul. 21, 2010.

* cited by examiner

*Primary Examiner* — Ismael Negron
(74) *Attorney, Agent, or Firm* — Paul W. Thiede

(57) ABSTRACT

A display assembly includes a light pipe having re-directing channels defined therein. When a light source is provided in a compartment of the light pipe, light admitted from the light source to the light pipe emits from a front face of the light pipe. In addition, light emitted from reflective surfaces spaced apart from external surfaces of the light pipe combine with light emitted through the front face to provide glow regions of light resulting in symmetric uniform illumination of the display.

26 Claims, 3 Drawing Sheets

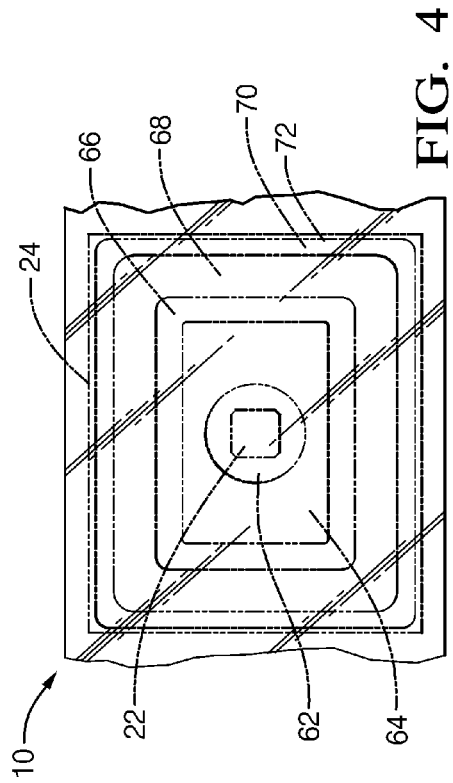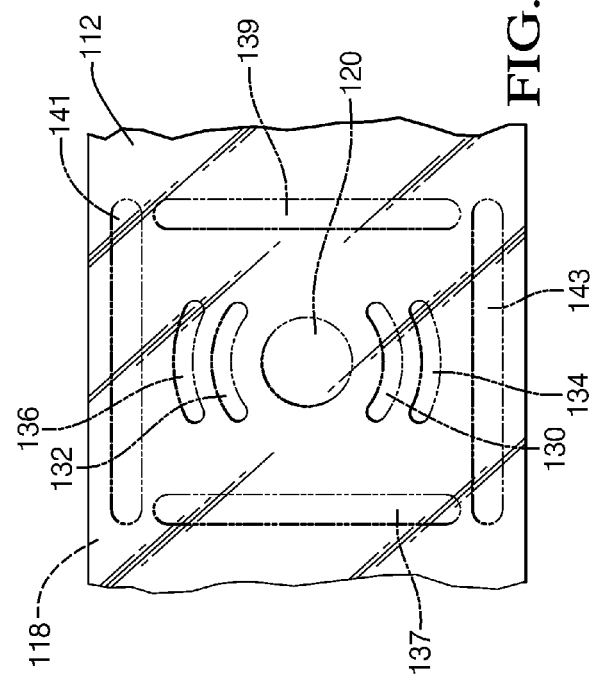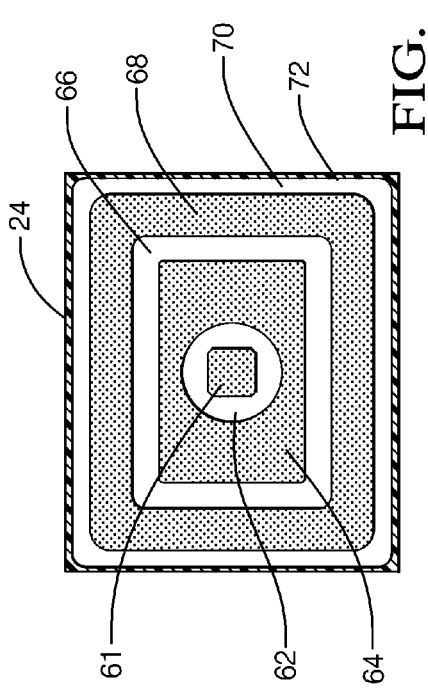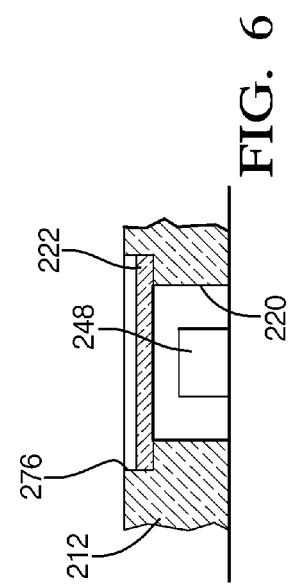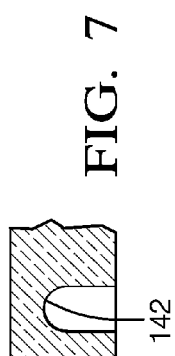

PIPE HAVING LIGHT-REDIRECTING CHANNELS

TECHNICAL FIELD

This invention relates to a display assembly comprising a light pipe to illuminate a display. More particularly, this invention relates to such assembly that comprises a light pipe defining a compartment for receiving a light source and light-extracting channel segments symmetrical about the compartment to provide improved illumination of the display.

BACKGROUND OF INVENTION

It is known to manufacture a display assembly comprising a display device, such as a liquid crystal device, illuminated by light emitted by a light pipe. A light source, such as an LED, is located proximate an edge of the light pipe. Light from the light source enters the light pipe through the edge and is extracted through the front face toward the display device. For edge-lit light pipes, the light intensity needs to be sufficient to provide suitable light to remote areas of the display. Moreover, a significant portion of the light from the light source is emitted in directions away from the light pipe, and either needs to be reflected back toward the light pipe or is lost for purposes of illuminating the display.

Therefore, what is needed is an improved display assembly that includes a light pipe for illuminating the display, wherein the light source is located relative to the light pipe in a manner that allows a greater proportion of the light from the light source to enter the light pipe and increased illumination of the display, and further provides more symmetrically uniform illumination of the display.

SUMMARY OF THE INVENTION

In accordance with this invention, a display assembly is adapted for emitting light to illuminate a display. The display assembly includes a light pipe having a front face and a rear face opposite the front face. The light pipe defines a compartment for receiving a light source. The light pipe also includes channel segments that are formed in the rear face and are symmetrical about the compartment. The channel segments have an outer wall and an inner wall effective to redirect light from the compartment toward the front face. By locating the light source within the compartment, and arranging light-extracting channel segments symmetrically about the compartment, the light pipe increases the proportion of light used to illuminate the display, and provides more uniform lighting of the display.

BRIEF DESCRIPTION OF THE DRAWINGS

This invention will be further described with reference to the accompanying drawings in which:

FIG. 4 is a plan view of the light pipe in FIG. 1;

FIG. 5 is a view showing an exemplary illumination pattern from the light pipe in FIG. 4;

FIG. 6 is a cross section view of a portion of a light pipe in accordance with an alternate embodiment;

FIG. 7 is a cross section of a portion of a light pipe in accordance with an alternate embodiment; and FIG. 8 is a plan view of a light pipe in accordance with an alternate embodiment of the invention.

DETAILED DESCRIPTION OF THE PREFERRED EMBODIMENT

Figure 1:
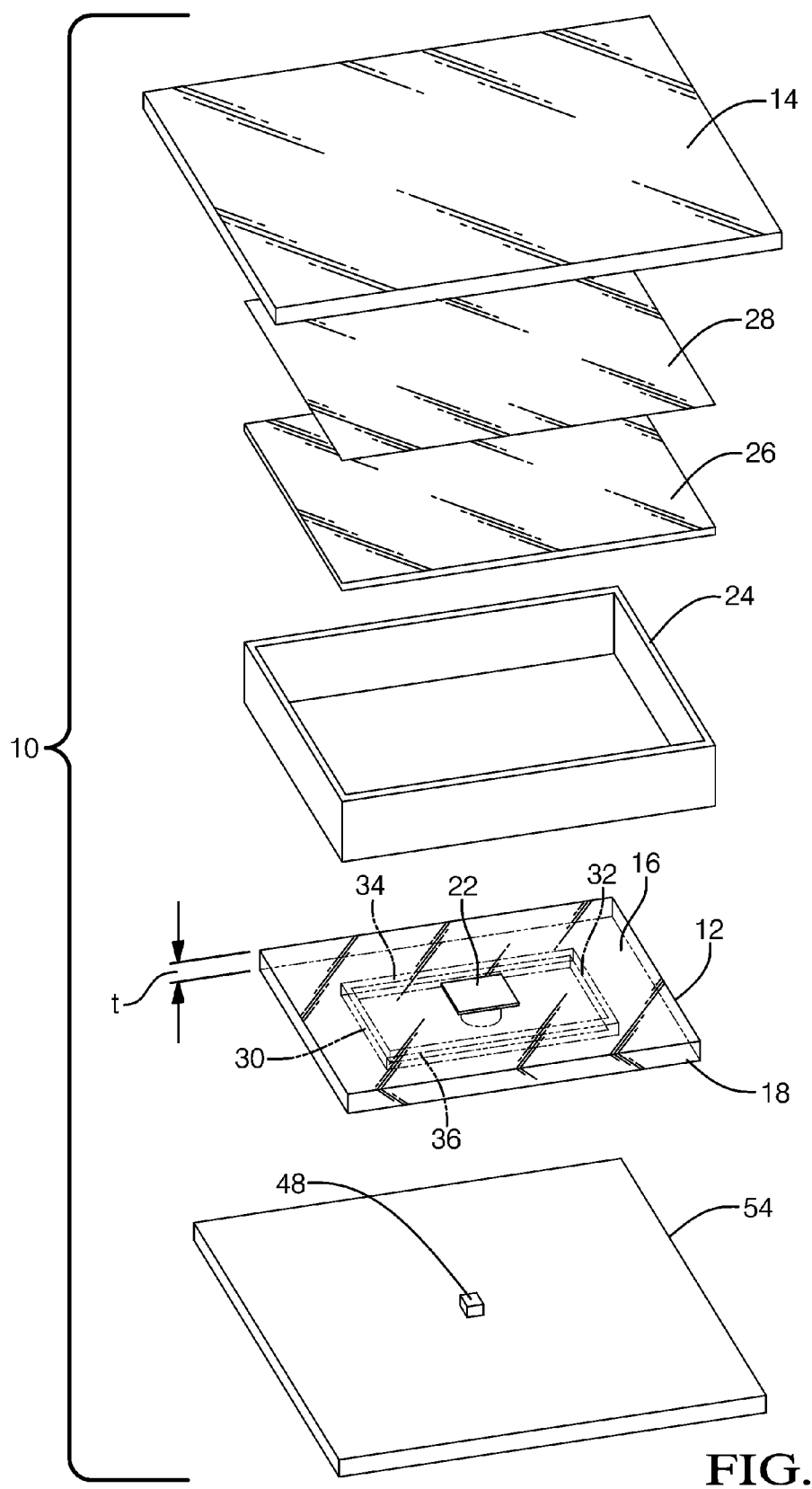
FIG. 1 is an exploded view of a display assembly in accordance with this invention.

In accordance with a preferred embodiment of this invention, referring to FIGS. 1-5, a display assembly 10 comprises a light pipe 12 for emitting light to illuminate a display device 14 overlying pipe 12. A suitable display device is a liquid crystal display (LCD) device. In general, this invention may be used to illuminate any display device that requires backlighting to present visual information.

Assembly 10 further comprises a diffuser 26 overlying pipe 12 and intermediate pipe 12 and display 14. In general, the diffuser is used to spread out and scatter light emitted from the light pipe across the display. A preferred diffuser is formed of a white polymeric film, such as white polycarbonate film. In this embodiment, assembly 10 includes a brightness enhancing film 28 intermediate device 14 and diffuser 26 that further increases the luminance.

Pipe 12 is formed of a transparent material. Suitable materials include glass and polymeric resin such as an acrylic or polycarbonate compound. Pipe 12 includes a front face 16 and a rear face 18 opposite front face 16 that are planar and parallel, and sides 19 intermediate faces 16, 18. In this example, pipe 12 is rectangular. Pipe 12 defines a compartment 20 having an opening at rear face 18. Compartment 20 is defined by a cylindrical wall 21 that is optically smooth. As used herein, an optically smooth surface refers to a surface that is highly polished to minimize scattering of light impinging thereon. Alternately, the surfaces may be textured to increase scattering. Compartment 20 has a diameter and height sufficient to accommodate and receive a light source, which in the embodiment is a light emitting diode 48.

Figure 2:
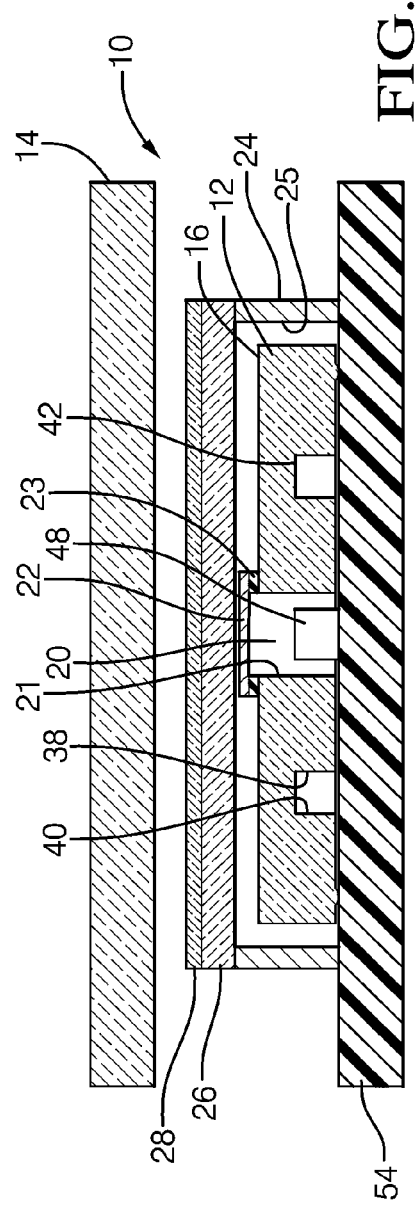
FIG. 2 is a cross section view of the display assembly of FIG. 1.
Figure 3:
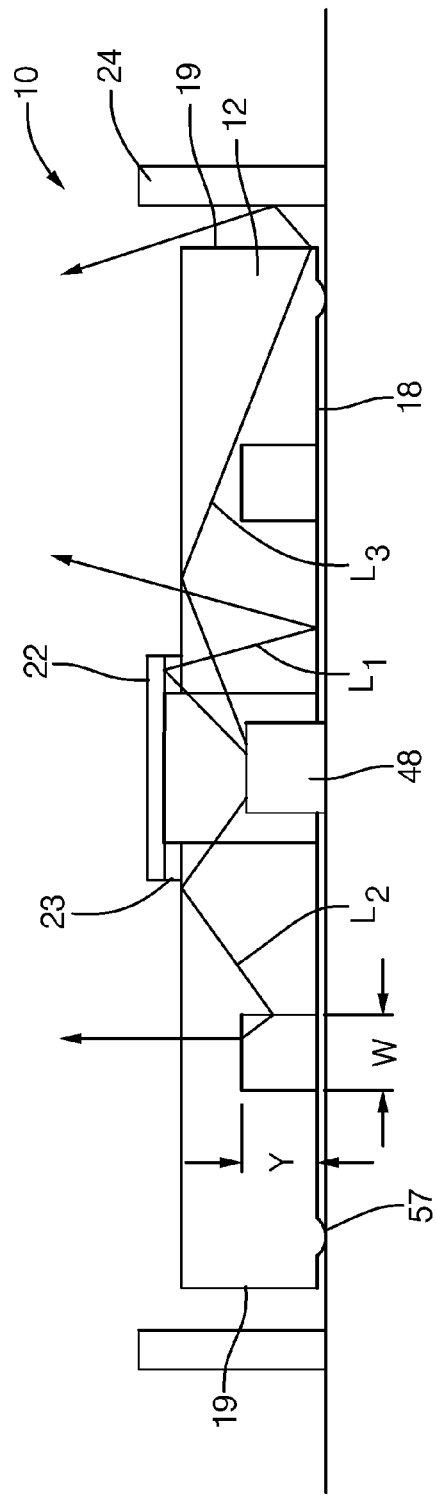
FIG. 3 is a diagram of components of the display assembly of FIG. 2, showing light paths therethrough.

Assembly 10 also comprises a light shield 22 overlying compartment 20 to intercept light from diode 48 that is emitted directly toward the display device. Referring to FIGS. 2-3, shield 22 is adhesively bonded to front face 16 by an adhesive 23. A suitable adhesive is a transparent, ultraviolet curable acrylic adhesive. Shield 22 includes a reflective surface facing diode 48 that reflects the remainder of the light toward the light pipe. Adhesive 23 preferably bonds to face 16 with optical wetting to allow the reflected light to be admitted into the light pipe with minimal loss. Preferably, shield 22 is formed of polymeric material and is semi-opaque to reflect the major portion of the light, while allowing some light to be transmitted therethrough for illuminating the center of the display. Alternately, shield 22 may be substantially opaque to minimize light transmission toward the center of the display. Shield 22 is suitable to be large enough to overlie the diode such that the diode is not seen by viewer looking into front face 16 of pipe 12 at any viewing angle.

Assembly 10 also includes a housing 24 that surrounds pipe 12 and is spaced apart from sides 19. Housing 24 includes an inner surface 25 proximate to pipe 12 that is white and reflective.

Referring to FIG. 1, light pipe 12 includes a first channel segment 30 and a second channel segment 32 formed in rear face 18 and symmetrical about compartment 20. Pipe 12 also includes a third channel segment 34 and a fourth channel segment 36, also formed in rear face 18 and symmetrical about compartment 20. In this embodiment, channel segments 30, 32, 34, 36 are linear and are interconnected to form a continuous, rectangular channel. Channel segments 30, 32, 34, 36 have an optically smooth surface. Referring to FIG. 3, channel segments 30, 32, 34, 36 have a predetermined width W and a predetermined depth Y. In this embodiment, depth Y is about one-third of pipe thickness t. The amount of light intercepted by channel segment is proportional to the depth, so that a depth of one-third of the pipe thickness intercepts approximately one-third of the light traversing in pipe 12. In general, the width W and the depth Y are selected based upon the desired uniformity and brightness requirements for backlighting display 14.

Each channel segment 30, 32, 34, 36 includes an inner wall, an outer wall facing the inner wall and an end wall. Referring to FIG. 2, channel segment 30 has inner wall 38 facing away from compartment 20, an outer wall 40 facing compartment 20, and an end wall 42. Inner wall 38 and outer wall 40 are planar and parallel, and are perpendicular to, and spaced apart from, front face 16. End wall 42 is planar and is in parallel, spaced relationship to front face 16.

Diode 48 is preferably a thin, high flux device capable of producing high light illumination intensities. Diode 48 is mechanically and electrically attached to a circuit board 54 having connections for supplying electrical energy the diode. Pipe 12 is secured to circuit board 54 using mechanical fasteners (not shown). Circuit board 54 is typically formed of FR4 circuit board material, or the like. The surface of circuit board 54 proximate rear face 18 preferably comprises a reflective coating to increase the proportion and uniformity of light illuminating the display. Pipe 12 comprises stand-off feet 57 that prevents rear face 18 from resting directly on board 54 and defines an air space intermediate light pipe 12 and board 54, thereby providing an air interface at rear face 18.

While not limited to any particular theory, pipe 12 is formed of a transparent material having an index of refraction effective to internally reflect light propagating longitudinally therethrough. In general, for light propagating through the light pipe at incident angles relative to the surfaces within a predetermined range, total internal reflection may be achieved when the index of refraction of the material is greater than the index of refraction of the adjacent material, typically air. Incident light outside the range is extracted through the front face and may be utilized for purposes of illuminating the display. In accordance with this invention, channel segments are provided that alter the path of light rays so that the incident angel is outside the range, and thus extract the light.

When light emitting diode is activated, light is emitted from the light source for backlight illumination of display 14 of assembly 10. Referring to FIG. 5, there is depicted a glow pattern of light extracted from light pipe 12 toward the display device. The glow pattern includes a glow regions 62, 66 and 70 and dark regions 61, 64 and 68. As used herein, glow region refers to a region having relatively high luminance, whereas dark regions refer to regions having reduced luminance. Referring to FIGS. 3 and 5, more particularly, central dark region 61 is created by shield 22 that reflects light from the light emitting diode, as indicted by ray L1, wherein light reflected by the shield propagates through the light pipe and, because it is not within the range of incident angles that result in internal reflection, is reflected by circuit board and extracted, thereby resulting in glow region 62 immediately about shield 22. Since in this embodiment, shield 22 is semi-opaque, region 61, although darker than the surrounding glow region 62, is illuminated by light that is transmitted through the shield, and so is not devoid of light.

A substantial portion of light from diode 48 propagates within the light pipe at an angle that is internally reflected by the faces thereof, as indicated by rays L2 and L3. In this manner, the internally reflected light propagates through the light pipe until encountering a surface that redirects the light so as to allow the light to be exit the light pipe. Because the light is internally reflected, minimal light is emitted by dark regions 64 and 68. However, a portion of the light is intercepted by channel segments 30, 32, 34 and 36 and is redirected, as indicated by ray L2, at an angle that causes the light to be extracted, thereby resulting in glow region 66 and providing preferential backlighting for the middle region of display device 14. Light refracted by the channel segments may also be refracted toward circuit board 54 and reflected or scattered toward the front face, further contributing to glow region 66. A portion of the light propagating through the light pipe is not intercepted by the channel segments, for example, propagating within the light pipe between the front face and the end wall 42, as indicated by ray L3. Upon reaching sides 19, the light exits the light pipe and is reflected by housing 24 or circuit board 54, thereby resulting in glow region 70. Some light may be reflected back towards sides 19, reenters pipe 12, and propagates through the light pipe by internal reflection until being redirected by channel segments 30, 32, 34 and 36, or by compartment 20.

Referring to FIG. 5, illumination uniformity and intensity of display 10 is a function of the combination of light from glow regions 62, 66, and 70. Following extraction, the light is diffused by diffuser 26 to provide more uniform illumination of display device 14. Diffuser 26 combines and spreads out light emitted from the glow regions to provide illumination of the display, including in regions overlying dark regions 61, 64 and 68. Additionally, diffuser 26 assists to obscure the contents of display assembly 10 from the viewer of display 14. Brightness enhancing film 28 contains a series of parallel prisms (not shown) that allows light to exit substantially perpendicular to display 14, thus, redirecting remaining light back into pipe 12 within housing 24. The recycling of light in assembly 10 aids to produce uniform backlighting for display 14.

In the described embodiment shown in FIGS. 1-5, backlighting is provided by light pipe having a rectangular channel with linear segments symmetrical about a central compartment. Alternately, backlighting may be provided using channel segments that are arcuate, or channel segments that are not interconnected. Referring to FIG. 8, in an alternate embodiment, a light pipe 112 comprises a first channel segment 130 that is arcuate, a second channel segment 132 that is arcuate, a third channel segment 134 that is arcuate, and a fourth channel segment 136 that is arcuate. Channel segments 130, 132, 134, 136 are in rear face 118. First channel segment 130 and second channel segment 132 are symmetrical about a compartment 120. Third channel segment 134 and fourth channel segment 136 are symmetrical about compartment 120. Third channel segment 134 is remote from compartment 120 and first channel segment 130. Fourth channel segment 136 is remote from compartment 120 and second channel segment 132. Additionally, a first vertical channel segment 137, a second vertical channel segment 139, a first horizontal channel segment 141, and a second horizontal channel segment 143, are linear. Vertical channel segments 137, 139 are symmetrical about compartment 120. First vertical channel segment 137 is parallel to second vertical channel segment 139. Horizontal channel segments 141, 143 are symmetrical about compartment 120. First horizontal channel segment 141 is parallel to second horizontal channel segment 143. Vertical channel segments 137, 139 are perpendicular to horizontal channel segments 141, 143.

Also, in the embodiment in FIGS. 1-5, the light shield is adhesively affixed to the front face of the light pipe. Alternately, the light shield may be suitably disposed in a recess formed in the front face about the central compartment. Referring to FIG. 6, a recess 276 is formed in the front face of pipe 212 about compartment 220 that contains diode 248. A light shield 222 is disposed in the recess. The light shield may be secured by adhesive. Alternately, the light shield may be secured with a press, or interference fit securing to eliminate the need for adhesive. Still further, the light shield may be integrally molded (not shown) in the compartment of the light pipe. Recessing the light shield provides a front face for the light pipe that is planar, thereby allowing the overall height of the assembly to be reduced. Moreover, when a semi-opaque shield is used, positioning the shield closer to the light source may increase the portion of light transmitted therethrough to brighten illumination of the center of the display.

In the embodiment in FIGS. 1-5, the channel segments included an end wall that is planar and parallel to the front face of the light pipe. In a further alternate embodiment, referring to FIG. 7, the channel segments include a concave end wall 142 intermediate the inner wall and the outer wall. The concave end wall facilitates manufacturing optically smooth channel surfaces that minimize light scattering.

Thus, this invention provides a display assembly that provides improved backlight uniformity while achieving increased illumination levels. A light shield is provided overlying the compartment containing the light source to avoid an bright spot in the display. Channel segments in a rear face symmetrical about a compartment enhance illumination in the middle portion of the display. Light reflection about the sides of the light pipe provides enhanced illumination along an outer periphery of the display. This allows the light to be combined or spread out, for example, using a diffuser and a light enhancing film, to provide a desired illumination pattern for the display.

While this invention has been described in terms of the preferred embodiment thereof, it is not intended to be so limited, but rather only to the extent set forth in the claims that follow.

We claim:

1. A display assembly comprising:
    a light pipe adapted for emitting light to illuminate a display, said pipe comprising a substantially planar front face and a rear face opposite the front face, said pipe defining a compartment and a first channel segment and a second channel segment symmetrical about the compartment, said first channel segment and said second channel segment being formed in the rear face and having an outer wall and an inner wall effective to redirect light from the compartment toward the front face; and
    a light source received in the compartment for admitting light into the light pipe so that light admitted to the light pipe is emitted by the light pipe from the front face.

2. The display assembly in accordance with claim 1, wherein the light pipe comprises a recess formed in the front face overlying the compartment, and wherein the display assembly further comprises a light shield received in the recess.

3. The display assembly in accordance with claim 1, further comprising a display overlying the front face and illuminable by light emitted from the front face.

4. The display assembly in accordance with claim 1, wherein the outer wall faces the compartment, and wherein the inner wall faces the outer wall in parallel, spaced relationship, said inner wall and said outer wall being perpendicular to and spaced apart from the front face.

5. The display assembly in accordance with claim 1, wherein each said channel segment includes an end wall that is planar and is in parallel, spaced relationship to the front face.

6. The display assembly in accordance with claim 1, wherein the light pipe has an edge, and each said channel segment is intermediate the compartment and the edge.

7. The display assembly in accordance with claim 1, wherein the first channel segment and the second channel segment are arcuate.

8. The display assembly in accordance with claim 1, wherein the compartment is defined by a cylindrical wall.

9. The display assembly in accordance with claim 1, wherein each said channel segment includes a concave end wall intermediate the inner wall and the outer wall.

10. The display assembly in accordance with claim 1, further including,
    a light shield recessed below an external surface of the front face that overlies the compartment.

11. The display assembly in accordance with claim 1, wherein light produced by the display assembly and presented to the display exhibits a glow pattern comprising of alternating light and dark glow regions.

12. The display assembly in accordance with claim 1, wherein the rear face is substantially planar.

13. The display assembly in accordance with claim 1, wherein the first channel segment and the second channel segment are linear and parallel, and the light pipe further comprises a third channel segment and a fourth channel segment, wherein said third channel segment and said fourth channel segment are linear and parallel, and wherein the first channel segment, second channel segment, third channel segment, and fourth channel segment are interconnected to form a continuous rectangular channel segment.

14. The display assembly in accordance with claim 13, wherein the continuous rectangular channel segment consists only of a single continuous rectangular channel segment surrounding the compartment defined in the rear face.

15. The display assembly in accordance with claim 1, further comprising a diffuser overlying the front face.

16. The display assembly in accordance with claim 15, further comprising a brightness enhancing film overlying the diffuser opposite the light pipe.

17. The display assembly in accordance with claim 1, further comprising a light shield overlying the compartment and effective to prevent light emission from the compartment perpendicular to the front face.

18. The display assembly in accordance with claim 17, wherein the light shield is adhesively bonded to the front face.

19. The display assembly in accordance with claim 18, further comprising an adhesive bonding the light shield to the front face, said adhesive being transparent and forming a layer intermediate the front face and the light shield.

20. A display assembly comprising:
    a light pipe adapted for emitting light to illuminate a display, said pipe comprising a front face and a rear face opposite the front face, said pipe defining a compartment and a first channel segment and a second channel segment symmetrical about the compartment, said first channel segment and said second channel segment being formed in the rear face and having an outer wall and an inner wall effective to redirect light from the compartment toward the front face;
    a light source received in the compartment for admitting light into the light pipe; and a plurality of reflective surfaces respectively having a spaced relationship from a plurality of external surfaces of the light pipe, wherein light admitted to the light pipe is emitted by the light pipe from the front face in combination with light emitted from the plurality of reflective surfaces to illuminate the display.

21. The display assembly in accordance with claim 20, wherein the plurality of reflective surfaces each have a parallel, spaced relationship to at least one of, (i) sides of the light pipe, and (ii) the rear face.

22. The display assembly in accordance with claim 20, wherein at least a portion of the display is substantially illuminated by light emitting directly from the plurality of reflective surfaces.

23. The display assembly in accordance with claim 22, wherein the portion of the display is an outer perimeter of the display adjacent an edge of the display.

24. The display assembly in accordance with claim 20, wherein the plurality of reflective surfaces further includes a reflective surface having a spaced relationship from the rear face.

25. The display assembly in accordance with claim 24, wherein the reflective surface spaced apart from the rear face comprises a printed circuit board having a surface opposing the rear face containing a reflective coating, and the light source includes a light emitting diode that is electrically and mechanically attached to the reflectively coated printed circuit board, and the light emitting diode is a high flux device that produces high illumination light intensities.

26. The display assembly in accordance with claim 24, wherein the light pipe further comprises a plurality of feet extending from the light pipe to the reflective surface and the plurality of feet define a distance of the spaced relationship, said feet being distinctly different from said segments.

* * * * *